(12) United States Patent
Kleppen et al.

(10) Patent No.: US 9,486,873 B2
(45) Date of Patent: Nov. 8, 2016

(54) FINGERTIP AND FOOT PEDAL AMPERAGE CONTROL COMBINATION APPARATUS AND METHOD

(71) Applicant: CK Worldwide Inc., Auburn, WA (US)

(72) Inventors: Arthur Kleppen, Kent, WA (US); Aaron Walsberg, Auburn, WA (US); Jeff Sharpe, Auburn, WA (US)

(73) Assignee: CK WORLDWIDE INC., Auburn, WA (US)

( * ) Notice: Subject to any disclaimer, the term of this patent is extended or adjusted under 35 U.S.C. 154(b) by 275 days.

(21) Appl. No.: 14/208,393

(22) Filed: Mar. 13, 2014

(65) Prior Publication Data

US 2015/0258622 A1 Sep. 17, 2015

(51) Int. Cl.
*B23K 9/10* (2006.01)
(52) U.S. Cl.
CPC .................................. *B23K 9/1087* (2013.01)
(58) Field of Classification Search
CPC ......................... B23K 9/1087; B23K 37/0258
See application file for complete search history.

(56) References Cited

U.S. PATENT DOCUMENTS

| | | | | |
|---|---|---|---|---|
| 3,968,341 A * | 7/1976 | Manning | .............. | B23K 9/1087 219/132 |
| 4,510,373 A * | 4/1985 | Cox | .................... | B23K 9/1087 219/130.31 |
| 6,420,680 B1 | 7/2002 | Samodell | | |
| 2006/0231374 A1 * | 10/2006 | Braaten | ................... | H01H 3/14 200/18 |
| 2008/0116185 A1 | 5/2008 | Luck et al. | | |
| 2011/0248008 A1 * | 10/2011 | Long | ...................... | G05G 1/305 219/132 |
| 2012/0152909 A1 | 6/2012 | Hung | | |
| 2014/0076873 A1 * | 3/2014 | Wilder | ................ | B23K 9/1087 219/136 |

FOREIGN PATENT DOCUMENTS

EP 2081723 B1 7/2009

* cited by examiner

*Primary Examiner* — David Angwin
*Assistant Examiner* — Erin McGrath
(74) *Attorney, Agent, or Firm* — George A. Leone; Citadel Patent Law (57) ABSTRACT

A combination fingertip and foot pedal amperage control kit for a welding torch. A housing has a top surface with a channel adapted to accept a welding torch handle. A motion transducer is contained within the housing, the motion transducer includes a control tab for changing the motion transducer value when translationally moved. A slide trigger has one end coupled to the motion transducer within the housing to control the amount of current that flows to the welding torch, and a second end protruding outside of the housing including a fingertip grip. The housing and slide trigger are also removably affixed to a hand grip. A foot pedal amperage controller is adapted to accept the housing and slide trigger together with or separated from the hand grip, the foot pedal has an actuator adapted to move the slide trigger when the peddle is activated.

14 Claims, 9 Drawing Sheets

FINGERTIP AND FOOT PEDAL AMPERAGE CONTROL COMBINATION APPARATUS AND METHOD

TECHNICAL FIELD

The present invention is in the field of tungsten inert gas or similar type welding torches, and, more particularly, to a fingertip and foot pedal amperage control combination apparatus.

BACKGROUND

Inert gas shielded welding torches have been in common use for over four decades. These employ a fixed or consumable metal electrode contained within a torch head constructed so that the welding zone is surrounded by a blanket of an inert gas. The gases most normally used are helium and argon. Welding torches of this type are used especially with metals that are highly sensitive to oxidation. Aluminum is perhaps the most common of these metals but the method is critical for more exotic materials such as titanium and zirconium. Similarly, plasma torches employ a jet of extremely hot ionized gas to cause fusion in the weld zone.

In similar fashion to conventional arc welding, inert gas shielded torches are characterized by high electrical currents at relatively low voltages. They tend to be rather small and compact in comparison to the rather bulky welding rod holders used for conventional arc welding.

One example of such a torch is disclosed in U.S. Pat. No. 4,788,401, issued on Nov. 29, 1988 to Kleppen, an inventor hereof, entitled "Inert gas welding torch." the disclosure of which is incorporated herein by reference. Kleppen discloses a tungsten inert gas or similar welding torch which is adjustable in length for different welding situations.

While fingertip amperage controls are commercially available as are foot pedal amperage controls, they must be currently purchased separately and do not work together. In many welding situations it is advantageous to be able to switch from controlling amperage from the power supply by a foot pedal to a fingertip control. For example, a foot pedal is very useful when the welder can be positioned on a chair or is otherwise stationary. However, for some situations, such as working under a car chassis, a fingertip control is preferred for both safety reasons and ease of use.

Unfortunately, an adaptable system which combines a finger-tip control with a foot pedal control is not currently available. The present invention provides a solution for such a combination which facilitates switching from fingertip control to foot pedal control. In one operational mode, the fingertip control is used in combination with a pistol grip which increases both accuracy and comfort for the user. Also provided is a low profile mode which is implemented by removing the pistol grip from the amperage control assembly module and connecting it to a torch handle.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a combination fingertip and foot pedal amperage control kit for a welding torch. A housing has a top surface with a channel adapted to accept a welding torch handle. A motion transducer is contained within the housing, the motion transducer includes a control tab for changing the motion transducer value when translationally moved. A slide trigger has one end coupled to the motion transducer within the housing to control the amount of current that flows to the welding torch, and a second end protruding outside of the housing including a fingertip grip. The housing and slide trigger are also adapted to be removably affixed to a hand grip. A foot pedal amperage controller is adapted to accept the housing and slide trigger together with or separated from the hand grip, the foot pedal has an actuator adapted to move the slide trigger when the peddle is activated.

In another aspect, the housing includes a clamshell housing.

In another aspect, the motion transducer comprises a potentiometer that can be interchanged with alternative potentiometers having range values, for example, from 1 kohm to 25 kohms or higher.

In another aspect, the motion transducer comprises a potentiometer has a range of at least 1 kohm.

In another aspect, the foot pedal includes a pedal, a housing adapted to fit within the pedal, a bias spring coupled at a first end to the pedal and at a second end to the housing, a coupler for attaching the slide trigger housing, a slide mechanism having a connector that mates with the fingertip grip on the slide trigger housing, and a slide spring coupled at one end to the bottom section and at the other end to the slide mechanism, thereby allowing the slide trigger to adjust the motion transducer setting when the foot pedal is activated.

In another aspect, the slide mechanism comprises a linear gear bar coupled to the foot pedal, a pinion meshing with the linear gear bar and a slide actuator coupled to the pinion, the slide actuator having a tab coupled to the slide trigger to move the slide trigger in a first direction as the foot pedal is pressed and in a second direction when the foot pedal is released so as to control the motion transducer output.

In another aspect, the hand grip has an ergonometric design.

In another aspect, the hand grip comprises a pistol grip.

In another aspect, the pistol grip has an outer casing having a plurality of recesses and a mating interface for receiving the fingertip control assembly.

In another aspect, the motion transducer comprises a linear potentiometer with a slide mechanism control tab.

In another aspect, the housing comprises a clamshell configuration having a space for enclosing the motion transducer and holding the motion transducer and fingertip slide trigger together, where the slide trigger maintains connection with the potentiometer slide mechanism control tab.

In another aspect, the housing further comprises a set of straps threaded through a plurality of notches in the housing.

In still another aspect, an amperage control method for a welding torch is disclosed for operating a slide trigger assembly in a first mode by attaching a slide trigger assembly to a hand grip, where the slide trigger assembly includes a housing having a top surface with a channel adapted to accept a welding torch handle, a motion transducer contained within the housing, the motion transducer including a control tab for changing the motion transducer value when translationally moved, and a slide trigger having one end coupled to the motion transducer to control the amount of current that flows to the welding torch, and having a second end including a fingertip grip, electrically coupling the slide trigger assembly to a power supply, removing the slide trigger assembly from the hand grip, and operating the slide trigger assembly in a second mode by attaching the slide trigger assembly to a foot pedal amperage controller adapted to accept the slide trigger whether or not it is separated from the hand grip, the foot pedal having an actuator adapted to move the slide trigger when the peddle is activated.

In another aspect, the motion transducer comprises a potentiometer including changing the potentiometer value up to 25 kohms in the first or second modes.

In another aspect, the motion transducer comprises a potentiometer including changing the potentiometer up to 1 kohm in the first or second modes.

In another aspect, operating in the second mode comprises rotating a pulley and belt in a first direction as the foot pedal is pressed and in a second direction when the foot pedal is released so as to move the fingertip grip coupled to the motion transducer.

In another aspect, the hand grip has an ergonometric design.

In another aspect, a welding torch is attached to the housing for operating in the first mode.

In another aspect, removable grip allows low profile fingertip control to be used alone.

In yet another aspect, the adjustable pistol grip can be repositioned for a longer or shorter reach to the fingertip slide to accommodate different finger lengths and/or hand sizes.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments for a combination fingertip and foot pedal amperage control system. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a combination fingertip and foot pedal amperage control for TIG welding. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
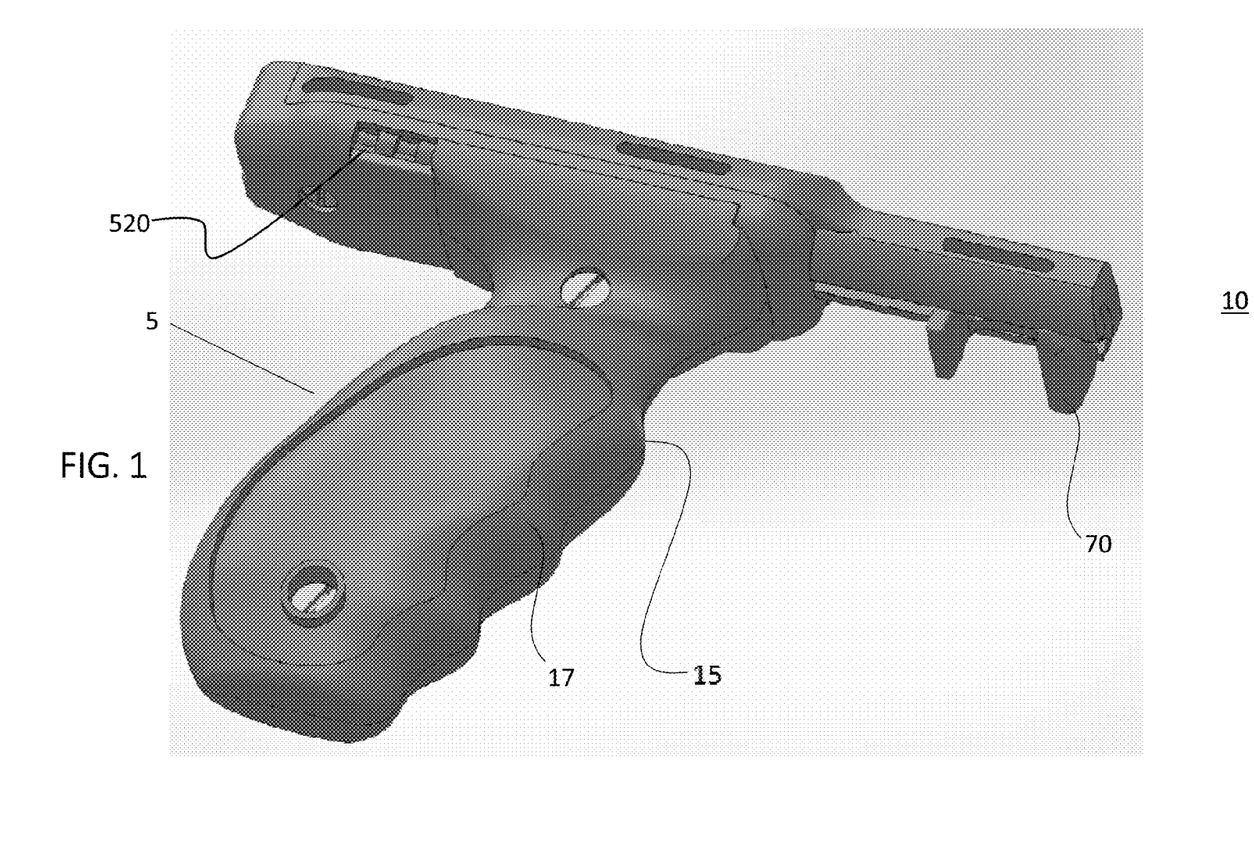
FIG. 1 schematically shows an example embodiment of a combination fingertip and foot pedal amperage control in a first configuration having a hand grip attached.

Referring now to FIG. 1, an example embodiment of a combination fingertip and foot pedal amperage control in a first configuration having a hand grip attached is schematically shown. The combination fingertip amperage control 10 is shown including and mounted to a removable hand grip 5. The hand grip includes an outer casing 15 and a plurality of recesses 17. A slide trigger 70 is provided for controlling a welding torch output.

Figure 2:
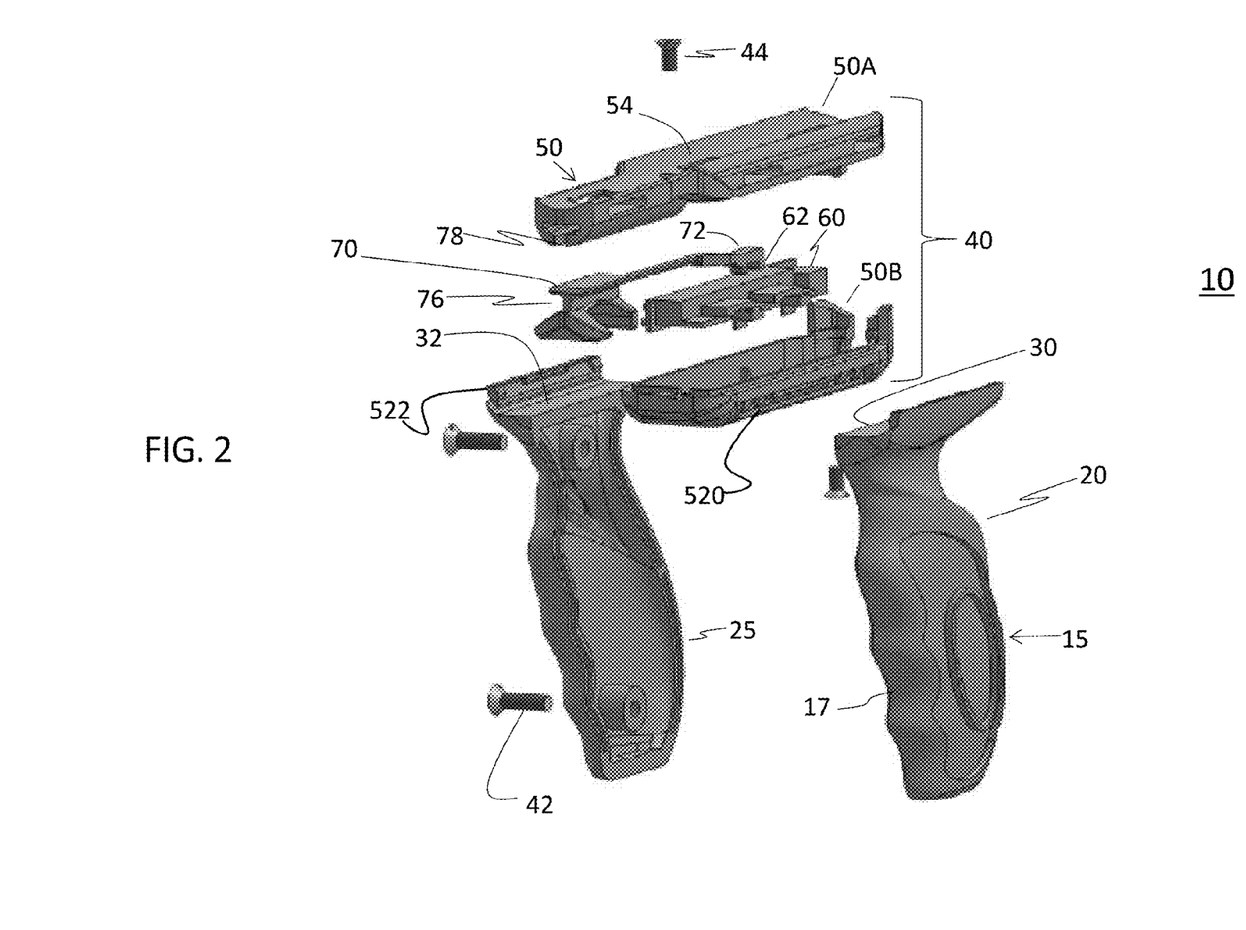
FIG. 2 schematically shows in more detail an exploded view of an example embodiment of a combination fingertip and foot pedal amperage control in a first configuration having a hand grip.

Referring now to FIG. 2, an exploded view of an example embodiment of a combination fingertip and foot pedal amperage control system in a first configuration having a hand grip is schematically shown in more detail. The outer casing 15 of the hand grip includes, for example, a first half 20 and a second half 25. The first and second halves 20 and 25 of the outer casing 15 may preferably be fixedly attached to one another in, for example, a clamshell configuration by screws 42 or the like. The first half 20 and the second half 25 form the plurality of recesses 17 when coupled to one another. In other embodiments, the hand grip 5 may be molded as a single piece. A first recessed surface 30 provides a mating interface, such as, for example, a mating groove 32 for receiving a slide trigger assembly such as, for example, a fingertip control assembly 40 which is attached, for example, by screw 44 or the like. In other embodiments of the invention, more or fewer recesses are included. The handle is further configured as a pistol grip to ergonomically conform to the shape of a user's hand (right or left) such that the device can be held and operated using a single hand without the user having to divert his or her line-of-sight.

The fingertip control assembly 40 includes a housing 50 having a top portion 50A with an elongated channel 54 running the length of the top surface 50A, the channel being conformed, for example, as a rounded trough, to accept a welding torch handle. The housing 50 further includes a bottom portion 50B. The top portion 50A and bottom portion 50B mate together in a clamshell fashion to form an interior space adequate for containing a motion transducer such as, for example, potentiometer 60. The potentiometer 60 includes a control tab 62 for changing the potentiometer value when translationally moved. The slide trigger 70 has a first end 72 coupled to the control tab 62 of the potentiometer 60. In a first configuration, the slide trigger is removably affixed to the hand grip. The first end 72 is contained within the housing and a second end 74 includes a fingertip grip 76. While the slide trigger first end 72 is attached to the potentiometer 60, it is slidably tracked within a groove 78 which is sized to allow translational movement when a fingertip is applied to move the fingertip grip. Since the slide trigger first end 72 is attached by the control tab 62 to the potentiometer 60 it moves translationally with the fingertip grip. When the control tab slides it changes the resistance value of the potentiometer and thereby controls the amount of current that flows to the welding torch when electrically coupled to a power supply.

In yet another aspect, the removable pistol grip 5 can be repositioned for a longer or shorter reach to the slide mechanism to accommodate different finger lengths and/or hand sizes. Positioning notches 520 are provided to mate with matching elements 522 on each half of the pistol grip 5. By repositioning the pistol grip 5 to mate with a selected set of positioning notches 520 the pistol grip 5 can be attached at various positions forward and back along the fingertip control assembly 40 to accommodate the preferred reach and/or comfort of an operator with respect to the slide mechanism.

Figure 3:
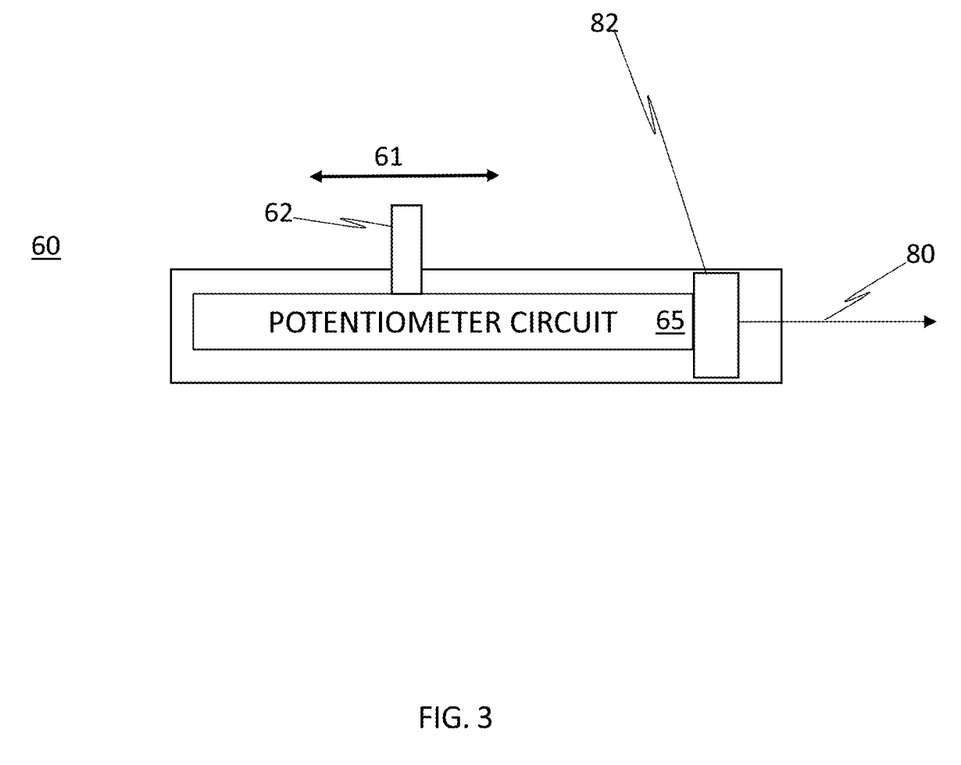
FIG. 3 schematically shows an example embodiment of a potentiometer as employed in a combination foot pedal and fingertip amperage control.

Referring now to FIG. 3 an example embodiment of a potentiometer as employed in a combination foot pedal and fingertip amperage control is schematically shown. In order to allow changing potentiometer types the potentiometer may advantageously be made as a "plug-and-play" device that can be electrically connected to power supply cables 80 by a removable plug 82. In this way different potentiometers with wider and narrower ranges of resistance may be easily placed into the housing. For example, potentiometers with a 1 kohm range, a 5 kohm range, a 10 kohm range, a 25 kohm range a 50 kohm range or higher may be used and easily interchanged depending on the welding power employed for a particular application. In a typical arrangement the potentiometer 60 comprises, for example, the cable 80 electrically coupled to the connector 82, which is, in turn, electrically coupled to a potentiometer circuit 65. The control tab 62 is adapted to slide laterally as indicated by double arrow 61 to control the amperage output through the cable 80 which controls the power to the welding torch in a conventional manner.

Figure 4:
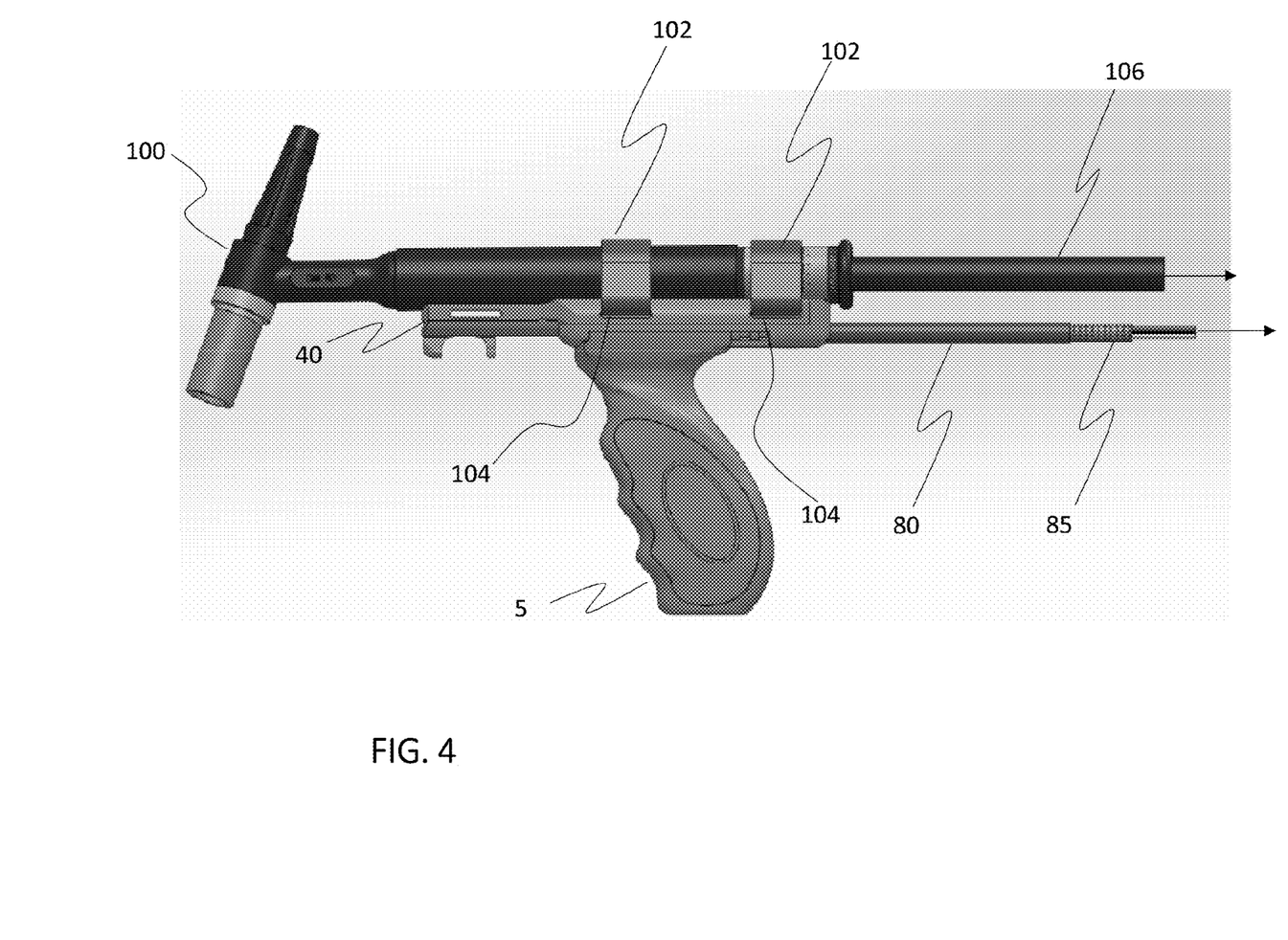
FIG. 4 schematically shows an example embodiment of a combination fingertip and foot pedal amperage control system in a first configuration attached to a welding torch.
Figure 6:
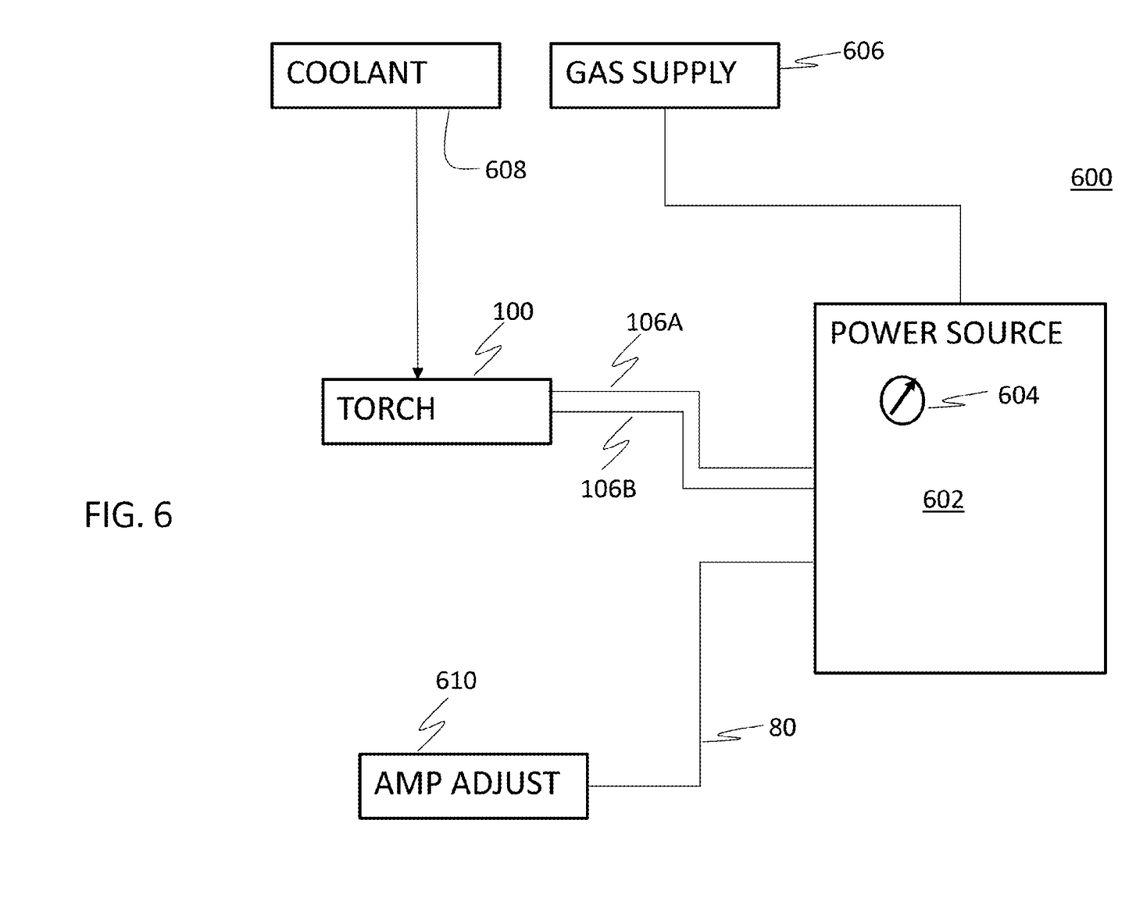
FIG. 6 schematically shows a block diagram of a welding system including an example of a combination fingertip and foot pedal amperage control system.

Referring now to FIG. 4, an example embodiment of a combination fingertip and foot pedal amperage control system in a first configuration attached to a welding torch is schematically shown. A welding torch 100 is attached to the fingertip control assembly 40 by, for example, straps 102 or the like which are held by notches 104 in the housing top 50A. Electrical and gas connections for the welding torch are represented here as included in torch power cable 106 and are, in turn connected to the gas supply, coolant and electrical power supply in the usual manner. Cable 80 is coupled to the electrical power supply amperage control (as shown in FIG. 6). The cable 80 advantageously includes high frequency metal electrical mesh shielding 85. The high frequency shielding is advantageously connected to draw high frequency energy to earth ground to reduce electromagnetic interference.

In another configuration, the fingertip control assembly 40 may be disconnected from the hand grip 5. It may still be connected to the welding torch handle by means of the straps 102. In that configuration an operator can control a welding torch operation by holding and manipulating the fingertip control assembly 40 while holding the welding torch handle. This conveniently makes the fingertip control assembly 40 useful in tight spaces or anywhere the use of a foot pedal or hand grip would not be desirable as determined by the operator.

Figure 5A:
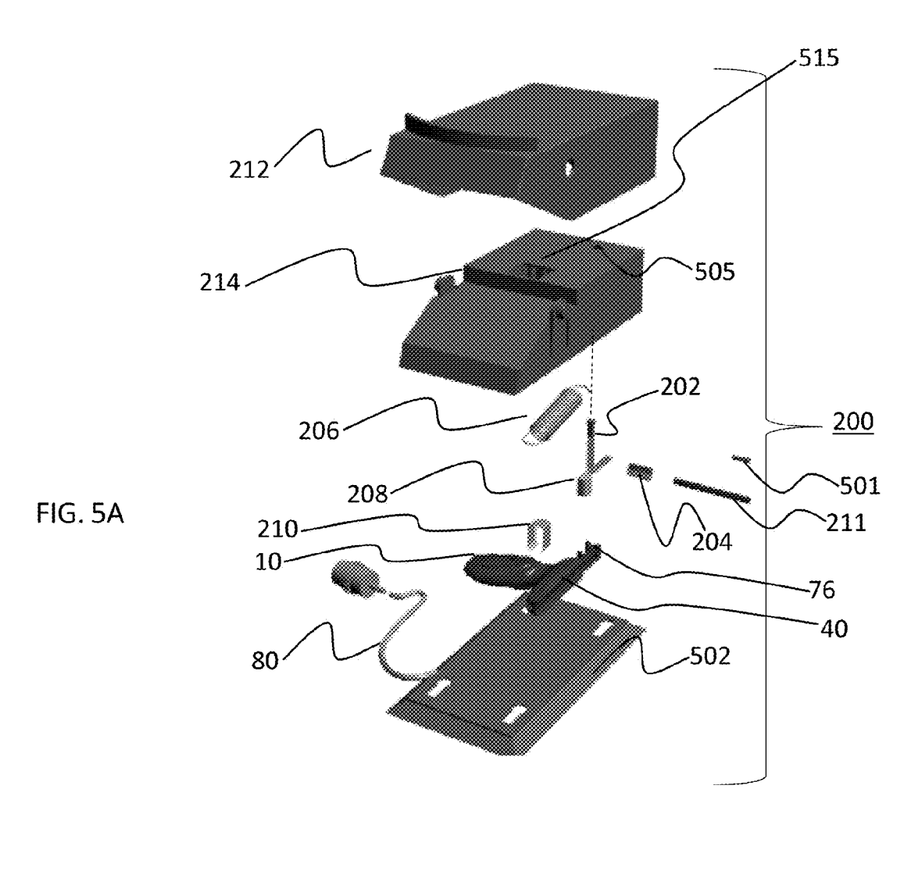
FIG. 5A schematically shows an exploded view of an example of a foot pedal with a fingertip control assembly attached in a second configuration within the foot pedal.

FIG. 5A schematically shows an exploded view of an example of a foot pedal with a fingertip control assembly attached in a second configuration within the foot pedal. A foot pedal assembly 200 includes a pedal 212, a bottom housing 214 and a base 502. Assembled within the housing are bias spring 206, a clip 210 for attaching the fingertip control assembly 40 to the base 502. As described below, the welding torch power is controlled by a configuration including the fingertip control assembly 40, a slide actuator 208, a linear gear bar 202, and a pinion 204.

Figure 5B:
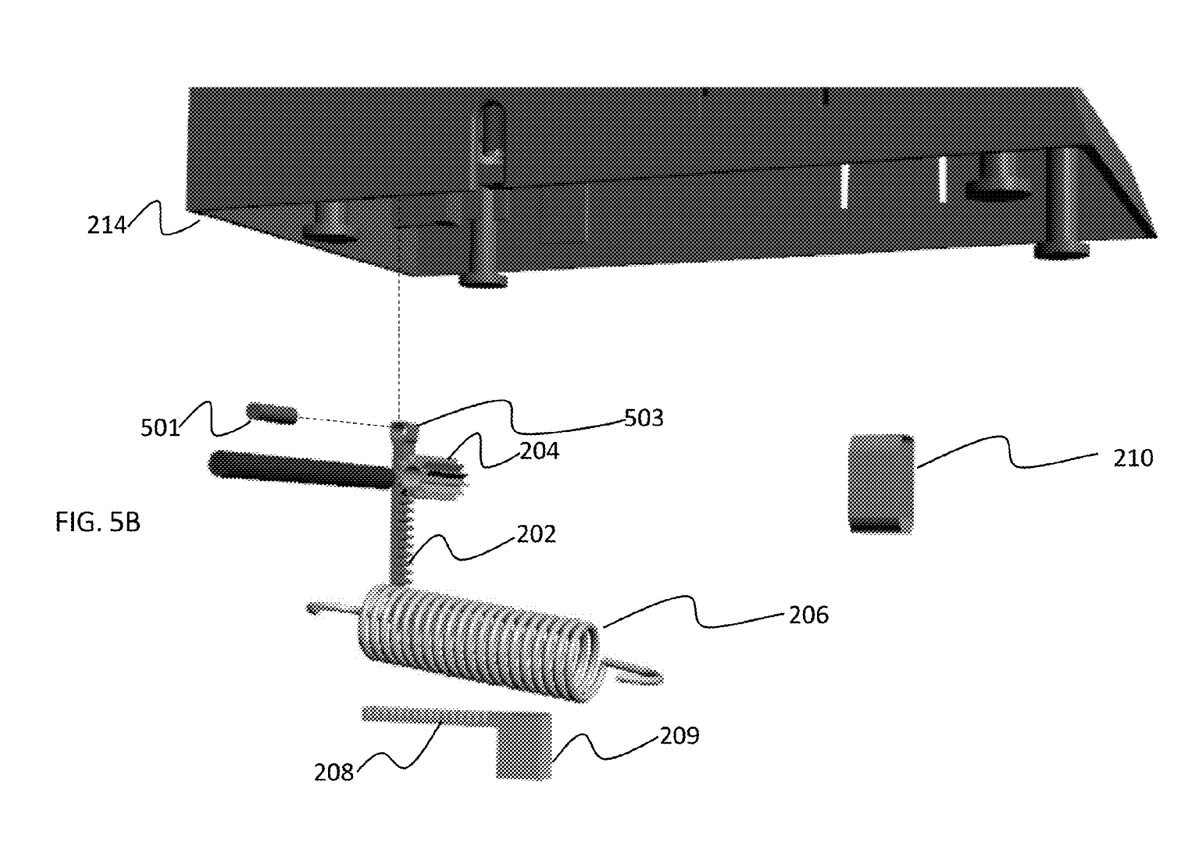
FIG. 5B schematically shows a more detailed exploded view of actuator components of the example of the foot pedal of FIG. 5A.

FIG. 5B schematically shows a more detailed exploded view of actuator components of the example of the foot pedal of FIG. 5A. The linear gear bar 202 is inserted through an insertion opening 505 (as shown in FIG. 5A) in the housing which is aligned to receive the linear gear bar 202. The linear gear bar 202 is then connected through the insertion opening 505 to the pedal and held in place by pin 501 which is inserted through collar 503 and attached to the underside of the pedal. The slide actuator 208 includes a tab 209 for engaging the potentiometer tab as described below. The bias spring 210 is connected at one end to the housing 214 by a (not shown) post extending through a larger opening 515 (as shown in FIG. 5A) and by the other end to the base or other convenient location.

Figure 5C:
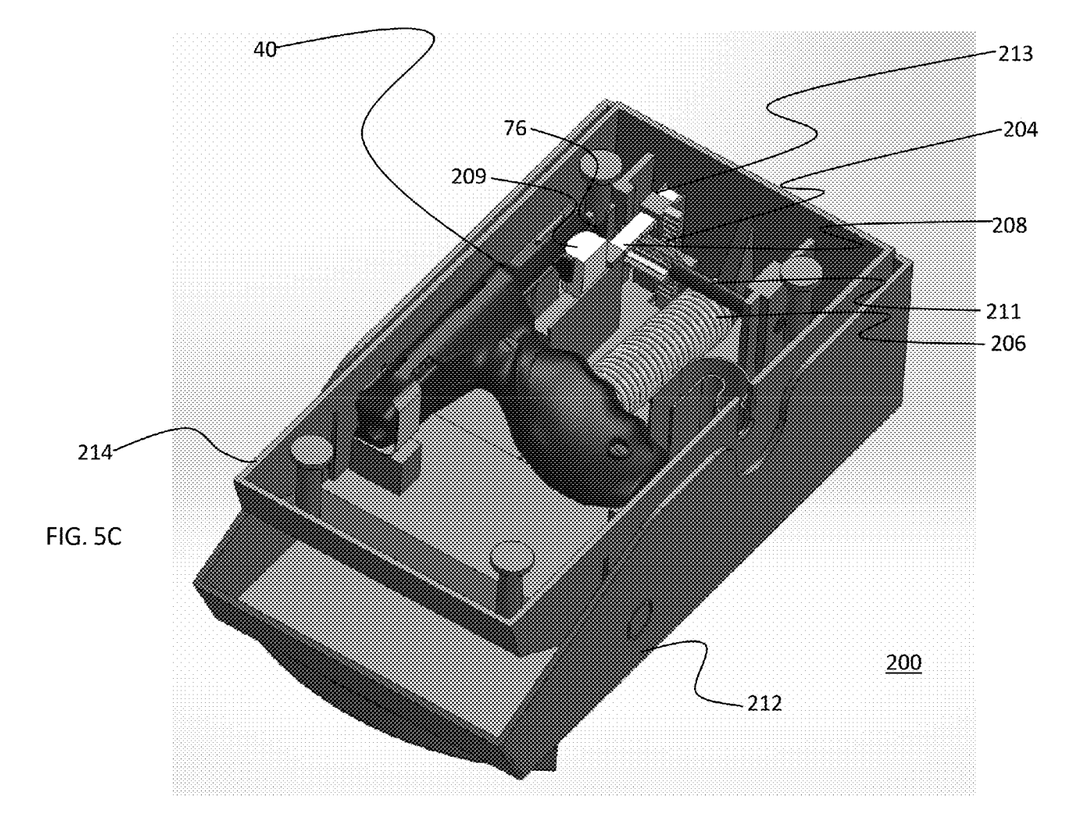
FIG. 5C schematically shows an example of a foot pedal with a fingertip control assembly attached in a second configuration assembled within the foot pedal.

Referring now to FIG. 5C, an example of a foot pedal with a fingertip control assembly attached in a second configuration is schematically shown in an open bottom view. As described above, the foot pedal 200 includes the pedal 212, the bottom housing 214 adapted to fit within the pedal 212, and the bias spring 206. The clip 210 attaches the fingertip control assembly 40 to the housing. As described above, the potentiometer tab mates with the fingertip grip 76 on the fingertip control assembly 40. The slide actuator 208 is slidably restrained by fasteners 213 so that its teeth mesh with the pinion 204 and the tab 209 contacts fingertip grip 76. The slide actuator 208 is coupled to move translationally to drive the potentiometer tab 62 via the fingertip grip 76 thereby adjusting the motion transducer setting when the foot pedal is activated. In the example embodiment shown here the slide mechanism comprises the linear gear bar 202 and the pinion 204 coupled to cooperate when the foot pedal 212 is pressed or released. When thusly activated the foot pedal is connected to raise or lower the linear gear bar 202 as the case may be, while the pinion 204 rotates on an axes 211 affixed within the bottom housing 214 and thereby moves the slide actuator 208.

Referring no to FIG. 6 a block diagram of a welding system including an example of a combination fingertip and foot pedal amperage control system is schematically shown. A welding system 600 includes a power source 602 with manual and automatic controls represented by dial 604. The power source is coupled to a torch 100 to supply gas and electrical power by means of lines 106A, 106B. A coolant 608 is supplied to the torch 100 as required. Also included is an amperage adjustment controller 610, which here comprises the new foot pedal and fingertip amperage control combination disclosed herein.

Figure 7:
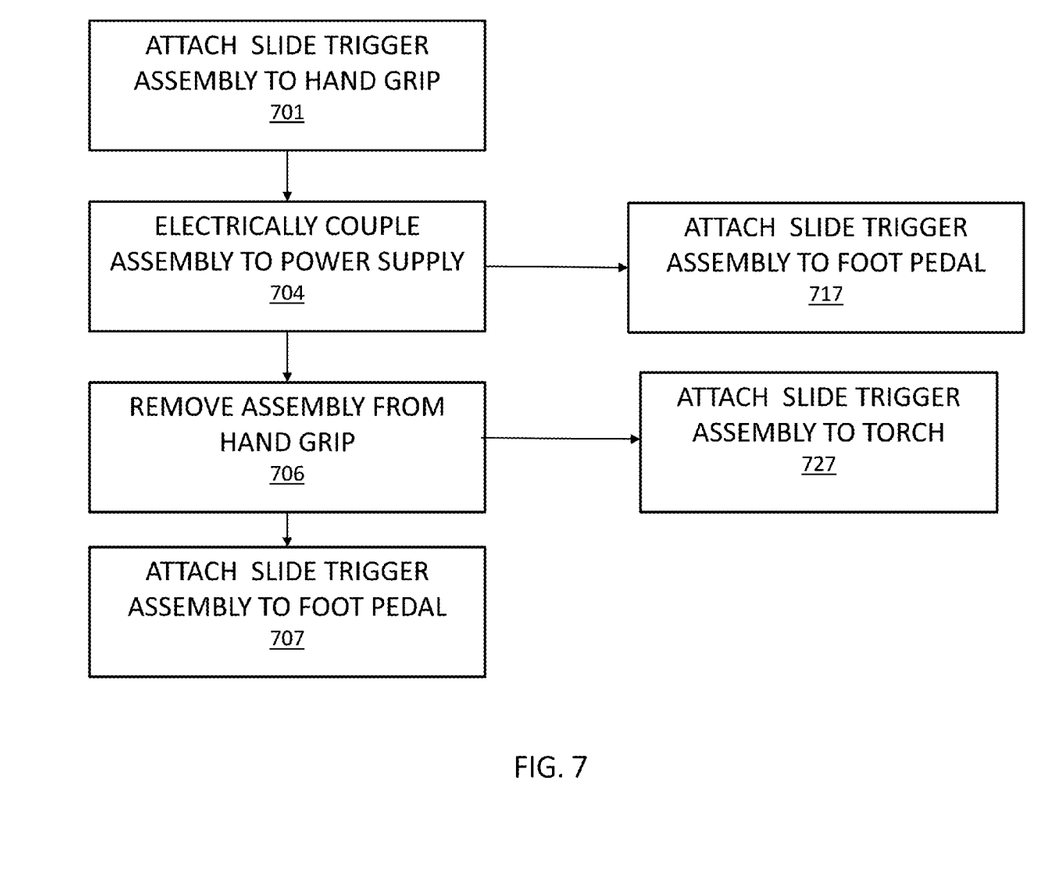
FIG. 7 schematically shows a block diagram of various modes of operation of an example of a combination fingertip and foot pedal amperage control.

Referring now to FIG. 7, a block diagram showing various modes of operation of an example of a combination fingertip and foot pedal amperage control system is schematically shown. At operation 701 a slide trigger assembly is used in a first mode by attaching a slide trigger assembly to a hand grip. For operating in the first mode a welding torch, such as a TIG welding torch, is attached to the amperage control assembly housing. As described above, the slide trigger assembly includes a housing having a top surface with a channel adapted to accept a welding torch handle, a motion transducer contained within the housing, the motion transducer including a control tab for changing the motion transducer value when translationally moved, and a slide trigger having one end coupled to the motion transducer to control the amount of current that flows to the welding torch, and having a second end including a fingertip grip. The slide trigger assembly is electrically coupled to a power supply 704.

In order to prepare for a second mode of operation the slide trigger assembly is removed from the hand grip 706 by removing the attaching screw or other attachment devices if present. The slide trigger assembly may now be used in a second mode by attaching the slide trigger assembly to a foot pedal amperage controller 707 adapted to accept the slide trigger when it is separated from the hand grip, the foot pedal having an actuator adapted to move the slide trigger when the peddle is activated as described herein above. In a third mode of operation 717 the slide trigger assembly with the hand grip is attached to a foot pedal amperage controller. In a fourth mode of operation 727 the slide trigger assembly detached from the hand grip is attached to a torch handle.

Having described the invention above, it is now considered useful to the understanding of the invention to describe further aspects of the construction details of one example embodiment. For example the hand grip and fingertip assembly components may be made from any suitable insulting material such as polymer composites, acrylics, plastic or the like. Wiring and cables are made using conventional techniques. The potentiometer may be any suitably sized potentiometer as may be commercially available or designed according to known principles.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A combination fingertip and foot pedal amperage control kit for a welding torch comprising:
   a control housing having a top surface with a channel adapted to accept a welding torch handle;
   a motion transducer contained within the control housing, the motion transducer including a control tab for changing the motion transducer value when translationally moved;
   a fingertip slide trigger having one end coupled to the motion transducer within the control housing to control the amount of current that flows to the welding torch, and having a second end protruding outside of the control housing including a fingertip grip;
   wherein the control housing and slide trigger are also adapted to be removably affixed to an adjustable pistol grip;
   a foot pedal amperage controller adapted to contain the control housing and slide trigger together with the adjustable pistol grip, the foot pedal amperage controller having an actuator adapted to move the slide trigger when the foot pedal amperage controller is activated;
   wherein the foot pedal amperage controller includes
      a foot pedal,
      a pedal housing adapted to fit within the foot pedal, wherein the control housing, slide trigger and adjustable pistol grip fit within the pedal housing,
      a bias spring coupled at a first end to the foot pedal and at a second end to the pedal housing,
      a coupler for attaching the control housing to the pedal housing,
      a slide mechanism having a connector that mates with the fingertip grip, and
      a slide spring coupled at one end to the pedal housing and at the other end to the slide mechanism, thereby allowing the fingertip slide trigger to adjust the motion transducer setting when the foot pedal is activated.

2. The amperage control kit of claim 1 wherein the control housing comprises a clamshell housing.

3. The amperage control kit of claim 1 wherein the motion transducer comprises a potentiometer that can be interchanged with alternative potentiometers having range values from 1 kohm to 25 kohms.

4. The amperage control kit of claim 1 wherein the motion transducer comprises a potentiometer having a range of at least 1 kohm.

5. The amperage control kit of claim 1 wherein the slide mechanism comprises a linear gear bar coupled to the foot pedal, a pinion meshing with the linear gear bar and a slide actuator coupled to the pinion, the slide actuator having a tab coupled to the slide trigger to move the slide trigger in a first direction as the foot pedal is pressed and in a second direction when the foot pedal is released so as to control an output from the motion transducer.

6. The amperage control kit of claim 1 wherein the adjustable pistol grip is configured as a pistol grip that ergonomically conforms to the shale of a user's hand such that the device can be held and operated using a single hand.

7. The amperage control kit of claim 6 wherein the adjustable pistol grip comprises: an outer casing having a plurality of recesses; and a mating interface for receiving the fingertip control assembly.

8. The amperage control kit of claim 1 wherein the motion transducer comprises a linear potentiometer with a slide mechanism.

9. The amperage control kit of claim 1 wherein the control housing comprises a clamshell configuration having a space for enclosing the motion transducer and holding the motion transducer and fingertip slide trigger together, where the slide trigger maintains connection with the potentiometer slide mechanism.

10. The amperage control kit of claim 1 wherein potentiometer includes at least one high frequency shielded electrical cable output line.

11. The combination fingertip and foot pedal amperage control kit of claim 1 wherein the housing and slide trigger can be used as a low profile fingertip control when the hand grip is removed.

12. The amperage control kit of claim 1 wherein the adjustable pistol grip can be repositioned for a longer or shorter reach to the slide trigger so as to accommodate different finger lengths and/or hand sizes.

13. A combination fingertip and foot pedal amperage control system for a welding torch comprising:

a control housing having a top surface with a channel adapted to accept a welding torch handle;

a motion transducer contained within the control housing, the motion transducer including a control tab for changing the motion transducer value when translationally moved;

a slide trigger having one end coupled to the motion transducer within the control housing to control the amount of current that flows to the welding torch, and having a second end protruding outside of the control housing including a fingertip grip;

wherein the control housing and slide trigger are also removably affixed to an adjustable pistol grip; and a foot pedal amperage controller adapted to accept the housing, the slide trigger and the adjustable pistol grip, the foot pedal having an actuator adapted to move the slide trigger when the pedal is activated.

14. The amperage control kit of claim 13 wherein the motion transducer comprises a potentiometer that can be interchanged with alternative potentiometers having range values from 1 kohm to 25 kohms.

* * * * *